United States Patent
Sartorius et al.

(10) Patent No.: US 7,624,256 B2
(45) Date of Patent: Nov. 24, 2009

(54) SYSTEM AND METHOD WHEREIN CONDITIONAL INSTRUCTIONS UNCONDITIONALLY PROVIDE OUTPUT

(75) Inventors: Thomas Andrew Sartorius, Raleigh, NC (US); James Norris Dieffenderfer, Apex, NC (US); Jeffrey Todd Bridges, Raleigh, NC (US); Kenneth Alan Dockser, Cary, NC (US); Michael Scott McIlvaine, Raleigh, NC (US); Rodney Wayne Smith, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 203 days.

(21) Appl. No.: 11/106,803

(22) Filed: Apr. 14, 2005

(65) Prior Publication Data
US 2006/0236078 A1    Oct. 19, 2006

(51) Int. Cl.
*G06F 13/00* (2006.01)
(52) U.S. Cl. .................................. 712/226; 711/169
(58) Field of Classification Search ................ 711/169; 712/236, 226
See application file for complete search history.

(56) References Cited

U.S. PATENT DOCUMENTS

| | | | | |
|---|---|---|---|---|
| 5,944,811 | A * | 8/1999 | Motomura | 712/23 |
| 6,009,512 | A * | 12/1999 | Christie | 712/226 |
| 6,170,052 | B1 * | 1/2001 | Morrison | 712/236 |
| 6,449,713 | B1 * | 9/2002 | Emer et al. | 712/234 |
| 6,883,089 | B2 * | 4/2005 | Kling et al. | 712/216 |
| 2002/0073301 | A1 * | 6/2002 | Kahle et al. | 712/235 |
| 2002/0112148 | A1 * | 8/2002 | Wang et al. | 712/226 |
| 2005/0066151 | A1 | 3/2005 | Kottapalli | |

OTHER PUBLICATIONS

Z. Wang and R. Lee "Micro-Architecture Issues of Predicated Execution", 7th Asilomar Conference on Signals, Systems and Computers, IEEE Press, Nov. 2003.*
Kessler, R.E., "The Alpha 21264 Microprocessor", IEEE Micro, IEEE Press, Mar./Apr. 1999.*
Phi-Prediction for Light-Weight If-Conversion; Weihau Chuang, Brad Calder, Jeanne Ferrante, 2003 IEEE, 0-7695-19313-X/03.
Micro-Architecture Issues of Predicated Execution; Zhenghong Wang and Ruby B. Lee; 2003 IEEE, 0-7803-8104-I/03.

* cited by examiner

*Primary Examiner*—Matt Kim
*Assistant Examiner*—John P Fishburn
(74) *Attorney, Agent, or Firm*—Nicholas J. Pauley; Peter Kamarchik; Sam Talpalatsky

(57) ABSTRACT

A conditional instruction architected to receive one or more operands as inputs, to output to a target the result of an operation performed on the operands if a condition is satisfied, and to not provide an output if the condition is not satisfied, is executed so that it unconditionally provides an output to the target. The conditional instruction obtains the prior value of the target (that is, the value produced by the most recent instruction preceding the conditional instruction that updated that target). The condition is evaluated. If the condition is satisfied, an operation is performed and the result of the operation output to the target. If the condition is not satisfied, the prior value is output to the target. Subsequent instructions may rely on the target as an operand source (whether written to a register or forwarded to the instruction), prior to the condition evaluation.

15 Claims, 3 Drawing Sheets

SYSTEM AND METHOD WHEREIN CONDITIONAL INSTRUCTIONS UNCONDITIONALLY PROVIDE OUTPUT

BACKGROUND

The present invention relates generally to the field of processors and in particular to a system and method of executing conditional instructions architected to not provide an output if a condition is not satisfied.

Microprocessors perform computational tasks in a wide variety of applications. A common goal in microprocessor design is improved performance, allowing for faster operation and/or increased functionality through software evolution. Many modern processors employ a pipelined architecture, where sequential instructions, each having multiple execution steps, are overlapped in execution. For higher instruction throughput, the instructions should flow continuously through the pipeline. Any situation that causes instructions to stall in the pipeline detrimentally affects instruction throughput and accordingly processor performance.

Instructions operate on data obtained from, and write their results to, memory. Modern processors utilize a hierarchical memory structure comprising a few fast, expensive memory elements, such as registers, at the top level. The memory hierarchy then comprises successively slower but less costly memory technologies at lower levels, such as cache memories (SRAM), solid-state main memory (DRAM), and disks (magnetic or optical media), respectively. For applications, such as portable electronic devices, DRAM is often the lowest level of the memory hierarchy.

Many processor instruction set architectures (ISA) include a set of General Purpose Registers (GPRs), which are architected registers used to pass data between instructions, and to and from memory. Instructions that perform logical and arithmetic operations on data read their operands from, and write their results to, specified GPRs. Similarly, memory access instructions read data to be written to memory from GPRs, and write data read from memory to GPRs. A compiler assigns a source and target GPR identifiers to each instruction, and orders the instructions, such that the proper results are calculated. That is, instructions are arranged in "program order" that guarantees correct results by directing earlier instructions to store results in specified GPRs, and directing later instructions to read those GPRs to obtain operands for further processing.

However, many processors execute instructions "out-of-order"—that is, in other than the instructions' program order. One example of a case where out-of-order execution arises is in superscalar designs, wherein two or more instructions may be executed in parallel, in different execution pipelines. If an instruction stalls in one pipeline, following instructions may be dispatched to a free pipeline for immediate execution. Out-of-order execution is not limited to superscalar designs, and may occur in single-issue designs. In either case, out-of-order execution presents certain problems.

Independent instructions may be executed without regard to original program order. However, many instructions exhibit a dependence on other instructions, known as "hazards." Data hazards arise when the reordering of instructions (such as that caused by out-of-order instruction issue) would change the order of access to the operand involved in the dependence. Data hazards of concern may be classified into three types. Consider two instructions, i and j, with i occurring before j in program order.

One type of data hazard is a Read after Write (RaW) hazard. This occurs when i writes a target register that is an operand source for j. If j attempts to read the register before i writes it, j improperly retrieves an old value. A Write after Write (WaW) hazard occurs when both instructions i and j write to the same target register, and j attempts to write its target before it is written by i. In this case, the writes are performed in the wrong order, leaving the value written by i in the register rather than the value written by j. A Write after Read (WaR) hazard occurs when j writes to a target register that is an operand source for i, prior to i reading the register. This causes i to incorrectly retrieve the new value, written by j, rather than the correct value, written by a previous instruction. Note that the Read after Read (RaR) case is not a data hazard; reads may be performed in any order.

For example, consider the following representative code fragment:

| | | |
|---|---|---|
| AND | r2, r10, r12 | logical AND the contents of r10 to the contents of r12, place the result in r2 |
| ST | r2, mem | store the contents of r2 to memory location mem |
| ADD | r2, r5, r6 | add contents of r5 and r6, place sum in r2 |

The ST has a RaW dependency on the AND. This data hazard requires that these instructions be executed in program order. Additionally, the ADD exhibits a WaR dependency on the ST. Semantically, the ADD cannot write its results to r2 until after the ST has completed its read of r2. Otherwise, the ST will write the result of the ADD to memory, when it should write the result of the AND. WaR and WaW data hazards are name dependencies, not true data dependencies, since no data is being passed from one instruction to the next (the only dependency is that one instruction not corrupt the contents of a register that the other instruction will read or has written). Name dependencies may be resolved by a technique known as register renaming.

In a register renaming system, a large set of physical registers, each having a physical register number (PRN), is managed by dynamically assigning logical register numbers (LRNs) to the physical registers. The LRNs may comprise, for example, the logical GPR identifiers (r0, r1, r2, . . . ). Preferably, the number of physical registers is greater than the number of LRNs, or architected GPRs. A Renaming Table (RT) maintains the dynamic mapping between LRNs and PRNs.

Early in the pipeline (e.g., at or following a decode stage), the register access characteristics of an instruction are inspected, and the LRNs (e.g., GPR identifiers) associated with the instruction are translated to PRNs via the RT. For instructions that write a register, a new LRN-to-PRN mapping is entered in the RT, mapping the LRN to an unused PRN, such that the write is directed to an associated physical register (that is, the LRN is "renamed"). Instructions that read a register translate their LRN to a PRN via a RT lookup. The PRN remains associated with the register-reading instruction throughout its tenure through the pipeline.

Register-writing instructions do not "corrupt" prior values written to the same LRN; the write is directed to a new, unused PRN (as the LRN is renamed to a new PRN). Instructions that follow the writing instruction in program order will be directed to the same PRN, to obtain the written value. Instructions preceding the writing instruction in program order were mapped by the RT to a different physical register (prior to the renaming operation), and will continue to access that physical register. Thus, instructions that write a given LRN may be executed ahead of instructions that read a prior value from the LRN (WaR) or write a prior result to the LRN (WaW). In this manner, the WaR and WaW name hazards are avoided.

To allow the processor to recover from an exception, a mispredicted branch, or the like, restrictions are placed on the availability (for further renaming) of physical registers to which data are written. For example, a LRN may be renamed to $PRN_1$, and the result of a first instruction written to the LRN, and hence to $PRN_1$. A second instruction may also write data to the LRN, which is renamed to $PRN_2$, and hence $PRN_2$ stores the second instruction's result. In this case, PRN1 is not free for another LRN to be renamed to it until the second instruction commits (meaning it, and all instructions ahead of it, have been fully exception-checked and are assured of completing execution). In addition, all instructions between the first and second instruction that reference the LRN (that is, all instructions that read $PRN_1$) must have completed a read of PRN1 or otherwise be guaranteed of eventually receiving that value. Only then can PRN1 be released, and made available for another LRN to be renamed to it.

Returning to the example code fragment above, when the AND instruction is decoded, and its write to LRN r2 detected, the LRN r2 is assigned in the RT to a physical register, say PRN x. The result of the AND is thus written to physical register x. When the ST instruction is decoded, its read from LRN r2 is detected, and the RT is accessed. LRN r2 is mapped to PRN x, so the ST instruction will read physical register x (thus obtaining the result written by the AND). When the ADD instruction is decoded, and its write to LRN r2 detected, the LRN r2 is re-assigned—or "renamed"—to a different physical register, say PRN y. Subsequent instructions that read LRN r2 will be directed by the RT to physical register y. Note that the ADD may execute prior to the ST; the ST will still retrieve the correct result from PRN x, thus the WAR hazard is resolved.

One problem with a register renaming system arises from the execution of conditional instructions. Conditional instructions are instructions that are architected to perform an arithmetic or logical operation and write the result, only if a condition is satisfied. Until the condition is evaluated (which often occurs deep in the pipeline), it cannot be determined whether a conditional instruction will write a register. If the condition is not satisfied, the conditional instruction is effectively a NOP, or a non-operation instruction, which does not alter any GPR. Because of the uncertainty whether a conditional instruction will write a register or not, subsequent instructions cannot ascertain whether a dependency on the conditional instruction exists until the condition is evaluated. For example, consider the following code fragment:

| CMP | r1, r12 | compare contents of r1 and r12 (set code or flag to reflect the result of the comparison) |
|---|---|---|
| AND | r2, r10, r12 | logical AND the contents of r10 to the contents of r12, place the result in r2 |
| SUBEQ | r2, r7, r8 | if the previous compare was equal, subtract contents of r8 from r7 and place result in r2. Otherwise, r2 is not changed |
| ST | r2, mem | store the contents of r2 to memory location mem |
| ADD | r2, r5, r6 | add contents of r5 and r6, place sum in r2 |

In this example, the ST cannot ascertain whether it has a data hazard with respect to the SUBEQ or not, until the EQ condition is evaluated. That is, the ST cannot determine if r2 will be written by the AND or SUBEQ instruction. Semantically, and actually in a processor that always issues instructions in program order, both the AND and SUBEQ are always executed, and the SUBEQ may or may not update the value of the r2 register; the ST doesn't "care" and will simply store the contents of r2. However, in an out-of-order design, the processor must determine whether the ST dependency is on the AND or the SUBEQ.

In particular, in a register renaming system, the processor must stall the pipeline early, at the register renaming stage, until the EQ condition is evaluated and it can be determined whether the SUBEQ will actually write r2. Since the condition is evaluated deep in the pipeline, this incurs undesirable pipeline stall. Alternatively, the RT may speculatively rename r2 to a new PRN for the SUBEQ instruction. In this case, the RT must have a mechanism to undo the renaming, i.e., to restore the mapping of the LRN r2 to the previously named PRN, if the EQ condition is not satisfied. This is necessary since, if the condition is not satisfied, the SUBEQ does not actually write the new PRN, and the RT would be left mapping LRN r2 to a physical register containing undefined data. This additional circuitry adds complexity and increases power consumption in the RT.

One type of instruction known in the art, the output of which is dependent on a condition evaluation, is a conditional select. A conditional select instruction is defined by the instruction set architecture to always (i.e., unconditionally) write a result. Only the value written, not whether an output is written, is dependent on the condition evaluation. For example, a conditional select ADD instruction, ADDSEQ r2, r3, r4, r5 may add the contents of r4 and r5, and place the result in r2, if the EQ condition is met. If the EQ condition is not met, the instruction places the contents of r3 in r2. Note that this instruction architecturally and semantically has an explicit input for the alternative result (in this example, a read of r3). The output then selects between the result of an operation or the alternate result, depending on the condition evaluation.

A conditional instruction is distinct from a conditional select. As used herein, a "conditional instruction" is an instruction that is architected to write the result of an operation to a target if a condition is satisfied, and to not write the target if the condition is not satisfied. That is, if the condition fails, the conditional instruction effectively converts to a NOP, and does not write any register or forward any result in an operand forwarding environment. It is precisely this uncertainty whether a conditional instruction will provide an output or not, that forces the processor to stall the pipeline at the register renaming stage (which generally occurs early in the pipeline) until the condition is evaluated (which often occurs late in the pipeline). Only when it is known whether or not the conditional instruction is a de facto NOP can data dependencies of following instructions be resolved. This type of conditional instruction is common in modern processor ISAs.

SUMMARY

A conditional instruction architected to receive one or more operands as inputs, to output to a target the result of an operation performed on the operands if a condition is satisfied, and to not provide an output if the condition is not satisfied, is executed so that it unconditionally provides an output to the target. The conditional instruction obtains the prior value of the target (that is, the value produced by the most recent instruction preceding the conditional instruction that updated that target). The condition is evaluated. If the condition is satisfied, the result of an operation performed on the operands is output to the target. If the condition is not satisfied, the prior value is output to the target. Subsequent instructions may rely on the target as an operand source (whether written to a register or forwarded to the instruction), prior to the condition evaluation.

One embodiment relates to a method of executing a conditional instruction in a pipelined processor, the conditional instruction architected to receive one or more operands as inputs, to output to a target the result of an operation performed on the operands if a condition is satisfied and to not provide an output if the condition is not satisfied. One or more operand values and a prior value of the target are received, and a condition is evaluated. If the condition is satisfied, an operation is performed on the operand values to generate a result value and the result is output to the target. If the condition is not satisfied, the prior target value is output to the target.

Another embodiment relates to a method of executing a conditional instruction architected to write the result of an operation to a logical target register if a condition is satisfied and to not write any register if the condition is not satisfied, in a pipelined processor employing a register renaming system dynamically mapping logical to physical registers. A first value is read from a first physical register associated with the logical target register. The logical target register is renamed to a second physical register. A condition is evaluated. If the condition is satisfied, an operation is performed to generate a result value, and the result value is written to the second physical register. If the condition is not satisfied, the first value is written to the second physical register.

Another embodiment relates to a method of executing a conditional instruction architected to write the result of an operation to a logical target register if a condition is satisfied and to not write any register if the condition is not satisfied. The method comprises reading a prior value from a first physical register associated with the logical target register.

Another embodiment relates to a method of executing a conditional instruction architected to write the result of an operation to a logical target register if a condition is satisfied and to not write any register if the condition is not satisfied. The method comprises unconditionally writing a value to the logical target register.

Another embodiment relates to a processor that includes a plurality of physical registers and a renaming table operative to dynamically associate logical register identifiers with the physical registers. The processor also includes an instruction execution pipeline operative to execute instructions out of program order. The pipeline is further operative to unconditionally assign a physical register as the target for a conditional instruction and as an operand source for an instruction having a contingent dependency on the conditional instruction, prior to evaluation of the condition. The conditional instruction is architected to write the result of an operation to a target if a condition is satisfied and to not write the target if the condition is not satisfied.

DETAILED DESCRIPTION

Figure 1:
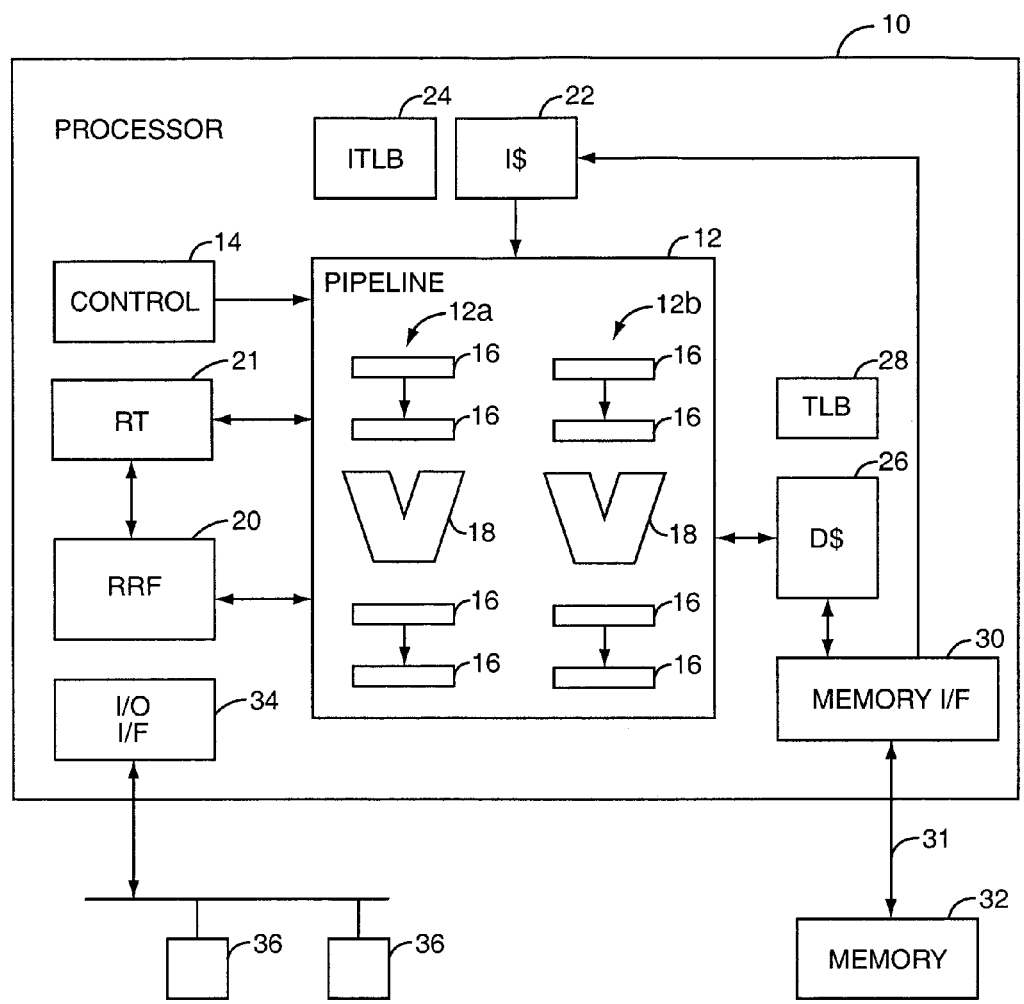
FIG. 1 is a functional block diagram of a processor.

FIG. 1 depicts a functional block diagram of a processor 10. The processor 10 executes instructions in an instruction execution pipeline 12 according to control logic 14. The pipeline 12 may be a superscalar design, with multiple parallel pipelines such as 12a and 12b. The pipelines 12a, 12b include various registers or latches 16, organized in pipe stages, and one or more Arithmetic Logic Units (ALU) 18. A Renaming Register File (RRF) 20 provides a large plurality of physical registers, in excess of the number of architected General Purpose Registers (GPRs). Registers in the RRF 20 comprise the top of the processor memory hierarchy, and serves as the primary operand(s) source and destination target for instructions. Associated with the RRF 20 is a Renaming Table (RT) 21 that dynamically associates logical GPR identifiers with physical registers in the RRF 20.

The pipelines 12a, 12b fetch instructions from an Instruction Cache (I-Cache) 22, with memory addressing and permissions managed by an Instruction-side Translation Lookaside Buffer (ITLB) 24. Data is accessed from a Data Cache (D-Cache) 26, with memory addressing and permissions managed by a main Translation Lookaside Buffer (TLB) 28. In various embodiments, the ITLB may comprise a copy of part of the TLB. Alternatively, the ITLB and TLB may be integrated. Similarly, in various embodiments of the processor 10, the I-cache 22 and D-cache 26 may be integrated, or unified. Misses in the I-cache 22 and/or the D-cache 26 cause an access to main (off-chip) memory 32, under the control of a memory interface 30 communicating over bus 31.

The processor 10 may include an Input/Output (I/O) interface 34, controlling access to various peripheral devices 36. Those of skill in the art will recognize that numerous variations of the processor 10 are possible. For example, the processor 10 may include a second-level (L2) cache for either or both the I and D caches. In addition, one or more of the functional blocks depicted in the processor 10 may be omitted from a particular embodiment.

According to one or more embodiments, the uncertainty of whether a conditional instruction will write a register or not—which uncertainty is not resolved until the condition is evaluated—does not give rise to a stall in the pipeline. The uncertainty is eliminated by the conditional instruction always (i.e., unconditionally) writing its target register. The value written to the target register depends on the condition evaluation. The conditional instruction reads the prior value of its own target (that is, the value produced by the most recent instruction preceding the conditional instruction that updated that target), and upon condition evaluation writes either that prior value (if the condition is not satisfied) or the result of an operation (if the condition is satisfied) to the target. In this manner, instructions following the conditional instruction are assured of the source of their operands—the target of the conditional instruction—without waiting for the condition to evaluate. In particular, a register renaming system may rename a conditional instruction's target LRN to a PRN in reliance on the PRN containing the correct value following the condition evaluation (either the result of the conditional operation or the result of a previous instruction or memory access).

Figure 2:
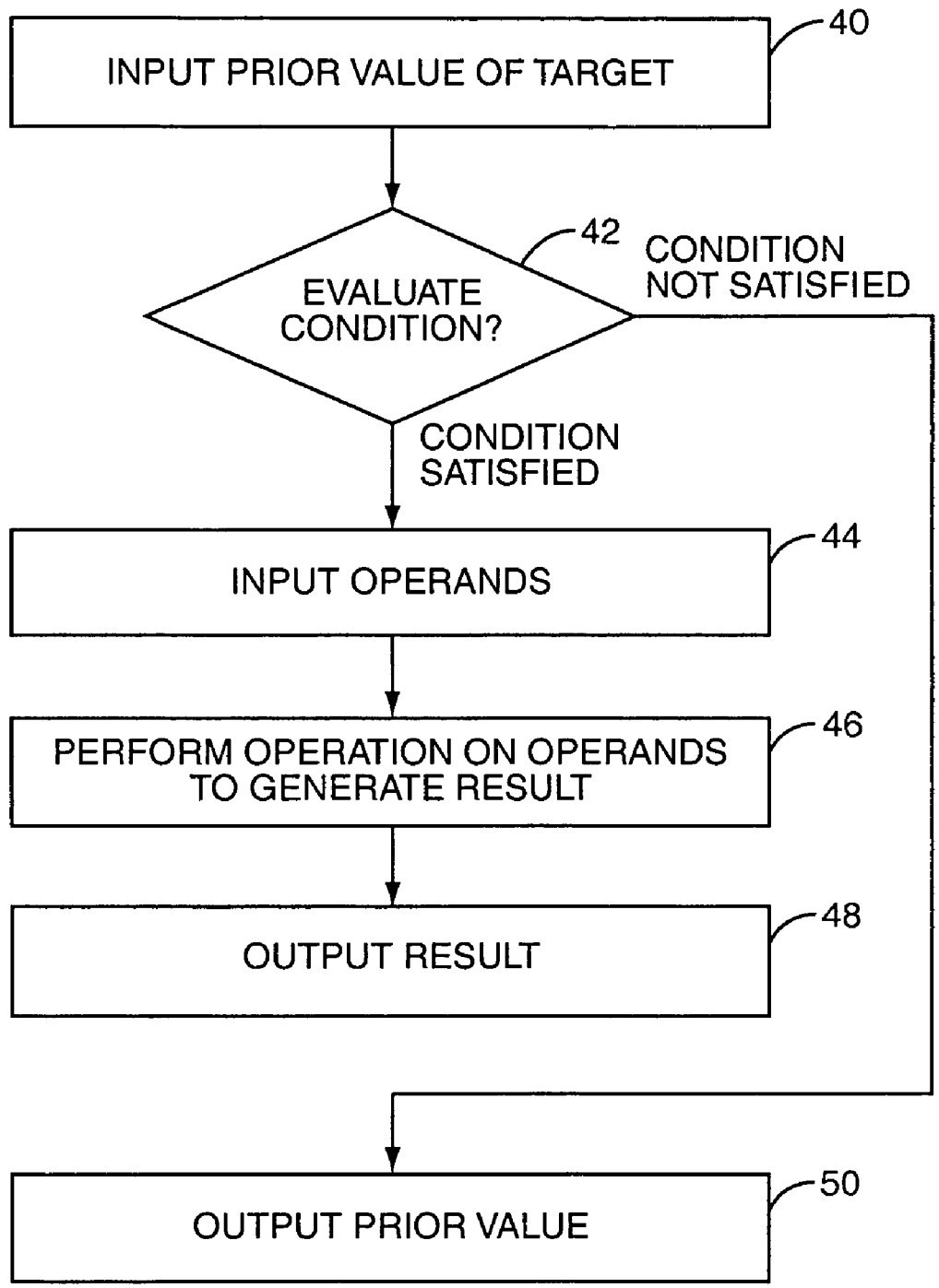
FIG. 2 is a flow diagram depicting a method of executing a conditional instruction.

One embodiment of a method of executing a conditional instruction is depicted in flow diagram form in FIG. 2. The conditional instruction inputs the prior value of its target (block 40). This may comprise reading the target LRN (e.g., a GPR identifier) assigned to the instruction—which, if register renaming is employed, equates to reading the PRN to which the RT maps the LRN when the conditional instruction is decoded. Alternatively, in an operand forwarding operation, inputting the prior value of the target may comprise directly obtaining the output of a prior instruction. In either case, the prior value is the result of a prior instruction or memory access operation. The conditional instruction reads the prior value due to the inventive method of executing the instruction; it is not an architected operand to the conditional instruction. While reading the prior value of the target is depicted as the first step in the method in FIG. 2, this is not necessarily required. The prior value of the target may be read at any time prior to a renaming of the logical identifier of the target, or even after the renaming, if the prior value is forwarded to the conditional instruction (such as from a memory access operation or the like).

The condition relevant to the conditional instruction is evaluated (block 42). This may occur deep in the pipeline, such as in an execute stage. For this reason, prior art conditional instructions caused pipeline stalls at the register rename stage, since whether or not the instruction would generate any output could not be ascertained until condition evaluation. Alternatively, if a register was renamed in anticipation of a value being written to it by the conditional instruction, the renaming operation had to be undone if the condition was not satisfied and the write did not occur.

If the condition is satisfied, one or more operands are input to the conditional instruction (block 44). This may comprise a read of GPRs or an operand forwarding operation. Those of skill in the art will note that the operand input step may precede condition evaluation; if the condition is not satisfied, the operands are simply discarded. An arithmetic or logical operation is performed on the operands (block 46) to generate a result, and the result is output (block 48). The output may be by writing to an LRN (i.e., a PRN associated with the LRN through the RT) or forwarding the result directly to another instruction.

If the condition is not satisfied (block 42), the conditional instruction outputs the prior value that was input from its target (block 50) (again, either by writing a target LRN or by operand forwarding), thus affirmatively providing the prior value in the case of a non-satisfied condition. In the embodiment depicted in FIG. 2, the operands are not read if the condition is not satisfied, nor is the operation performed. In other embodiments, reading the operands, and even performing the operation, may be done prior to the condition evaluation, with the operands and, if generated, the result, merely being discarded if the condition is not satisfied. Note that regardless of the condition evaluation, the conditional instruction provides an output (blocks 48, 50). This is in contrast to prior art methods of executing conditional instructions, which execute the instructions as architected—that is, providing an output only if a condition is satisfied, and do not provide any output (register write or operand forwarding) if the condition is not satisfied.

Figure 3:
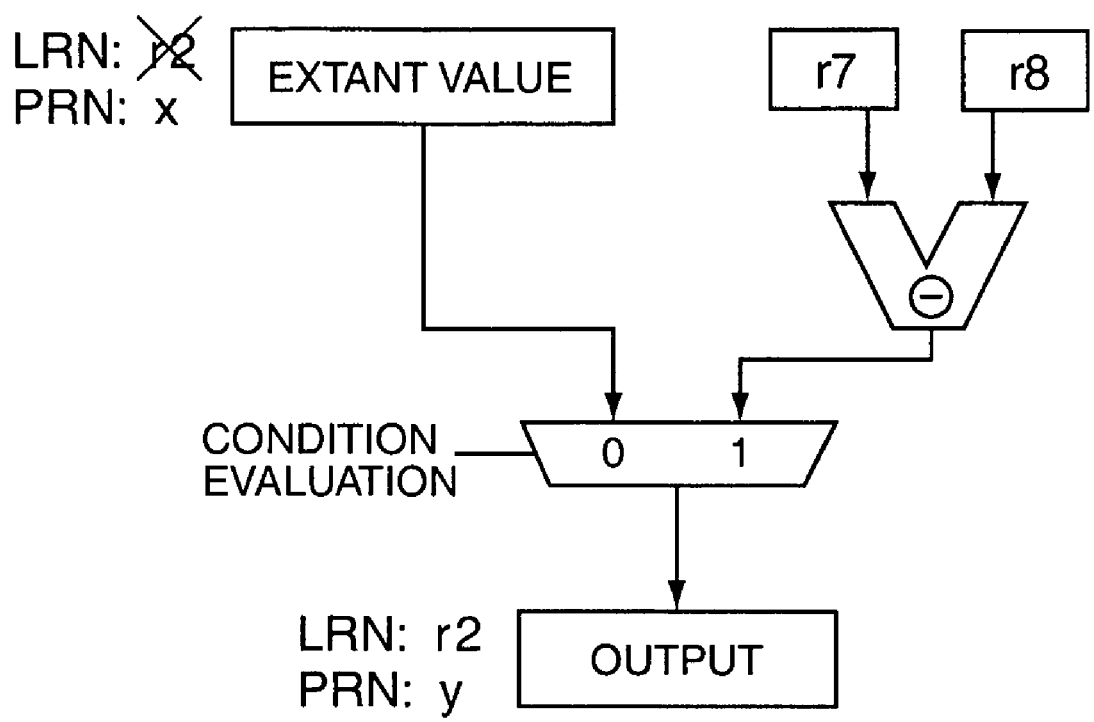
FIG. 3 is a functional block diagram depicting the output determination of a conditional instruction.

The output selection, according to one embodiment, is depicted schematically in FIG. 3, using the representative code fragment above, in particular the SUBEQ r2, r7, r8 instruction. The prior value of LRN r2 is read from PRN x, following the RT 21 mapping. This value (or at least, the PRN identifier) is maintained by the conditional instruction as it proceeds through the pipeline. The register renaming system may update the RT 21 prior to the condition evaluation, renaming the LRN r2 to a new physical register, PRN y. The operands are read from r7 and r8, and a subtraction operation performed in an ALU 18. The condition is evaluated, and the evaluation result determines whether the prior value or the result of the operation is written to the conditional instruction's target LRN r2 (renamed to PRN y). Those of skill in the art will recognize that FIG. 3 is representative only; in another embodiment, the reading of r7 and r8 and the subtraction operation may be performed only if the condition is satisfied.

Because the conditional instruction execution according to one or more embodiments unconditionally provides an output—either the result of an operation or the prior value of its target, depending on the condition evaluation—the pipeline need not be stalled to await the condition evaluation in many situations. For example, a RT 21 may rename the target LRN of the conditional instruction to an available physical register in the RRF 20 without waiting for the condition evaluation. Subsequent instructions that read that LRN are assured of obtaining a proper result from the physical register written by the conditional instruction. That physical register will contain either the result of an operation (if the condition is satisfied) or the value from the PRN that had previously been associated with the LRN, prior to the register renaming (if the condition is not satisfied). Thus, the pipeline need not stall at the register renaming stage to await the condition evaluation.

In one embodiment, operand forwarding is simplified by allowing a pipeline controller 14 to determine the source of an instruction's operand(s), when one or more of those operands may be provided directly by a conditional instruction, prior to evaluation of the condition. As well known in the art, operand forwarding is a technique by which the output of one instruction is directly forwarded to another instruction, without requiring a register write by the first instruction and a register read by the second. In the prior art, an instruction following a conditional instruction is unable to ascertain whether its operands will be forwarded by the conditional instruction (if the condition is satisfied) or a prior instruction (if the condition is not satisfied and the conditional instruction produces no output), and hence must wait for the condition evaluation to determine its operand source. By unconditionally providing an output, the method of conditional instruction execution of this embodiment eliminates this uncertainty, and allows a decision to be made as to the source of operands prior to evaluation of the condition. In particular, the pipeline controller 14 may reliably assign the conditional instruction as an operand source for a following instruction prior to evaluation of the condition, since the conditional instruction execution method will unconditionally forward an output. That output may be a prior value forwarded to the conditional instruction by a previous instruction (if the condition is not satisfied) or the result of an operation (if the result is satisfied).

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A method of executing a single conditional instruction via a pipelined processor, the method comprising:
   receiving a prior value produced by an instruction distinct from the single conditional instruction;
   evaluating a condition associated with the single conditional instruction to produce an evaluation outcome; and
   outputting a value of the single conditional instruction to a target irrespective of the evaluation outcome, wherein the value is:
   a result of performing an operation of the single conditional instruction on one or more operand values when the condition is satisfied; and
   the prior value when the condition is not satisfied.

2. The method of claim 1, wherein the prior value is received from a first register.

3. The method of claim 2, wherein the first register is a physical register in a register renaming system, and wherein a logical register is unconditionally renamed from the first register to a second register prior to evaluating the condition.

4. The method of claim 3, wherein an instruction subsequent to the single conditional instruction is unconditionally directed by a pipeline controller to the conditional instruction as an operand source prior to evaluating the condition.

5. The method of claim 1, wherein outputting the value comprises unconditionally forwarding the value to another instruction.

6. The method of claim 1, wherein the prior value is an output of a previously executed instruction that is forwarded to the single conditional instruction without requiring the single conditional instruction to read the output of the previously executed instruction from a register.

7. The method of claim 1, wherein outputting the value is performed by a pipeline controller.

8. The method of claim 7, wherein the single conditional instruction is unconditionally selected as a source of an operand of a second instruction prior to the evaluation of the condition.

9. A method of executing a single conditional instruction via a pipelined processor employing a register renaming system dynamically mapping logical registers to physical registers, the method comprising:
  reading a prior value from a first physical register associated with a logical target register by the single conditional instruction, wherein the prior value is read irrespective of an evaluation outcome of a condition associated with the single conditional instruction, the prior value produced by an instruction distinct from the single conditional instruction;
  renaming the logical target register to a second physical register;
  performing an operation on one or more operand values to generate a result value prior to determining whether the condition is satisfied; and
  outputting a value of the single conditional instruction, wherein outputting comprises:
    writing the result value to the second physical register when the condition is satisfied; and
    writing the prior value to the second physical register when the condition is not satisfied.

10. The method of claim 9, further comprising assigning, prior to evaluation of the condition, the second physical register to be an operand source of an instruction subsequent to the single conditional instruction.

11. A method of executing a single conditional instruction, the method comprising:
  reading a prior value from a logical target register irrespective of an evaluation of a condition associated with the single conditional instruction, the prior value produced by an instruction distinct from the single conditional instruction;
  performing an operation by the single conditional instruction on one or more operand values that generates a result; and
  outputting a value from the single conditional instruction, wherein outputting comprises:
    writing the result of the operation performed by the single conditional instruction to the logical target register when the condition is satisfied; and
    writing the prior value to the logical target register when the condition is not satisfied.

12. The method of claim 11, further comprising renaming the logical target register from a first physical register to a second physical register after reading the prior value and before evaluating the condition.

13. A processor comprising:
  a plurality of physical registers;
  a renaming table operative to dynamically associate logical register identifiers with the physical registers; and
  an instruction execution pipeline operative to execute a single conditional instruction to:
    read a prior value from a first physical register associated with a logical register identifier irrespective of an evaluation of a condition associated with the single conditional instruction, the prior value produced by an instruction distinct from the single conditional instruction;
    perform an operation on one or more operand values to generate a result; and
    provide the result when the condition is satisfied and provide the prior value when the condition is not satisfied.

14. The processor of claim 13, wherein the renaming table is operative to rename the logical register identifier from the first physical register to a second physical register after reading the prior value and before evaluating the condition.

15. The processor of claim 13, wherein the operation is performed before the condition is evaluated.

* * * * *